Dec. 25, 1962 W. SMALLEY 3,070,261
CONVEYOR FEEDERS
Filed Feb. 19, 1960 3 Sheets-Sheet 1
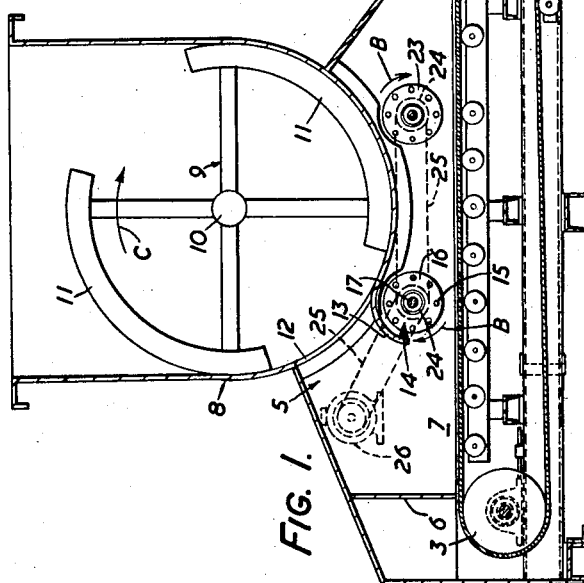
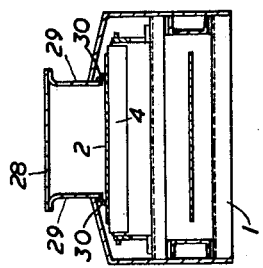
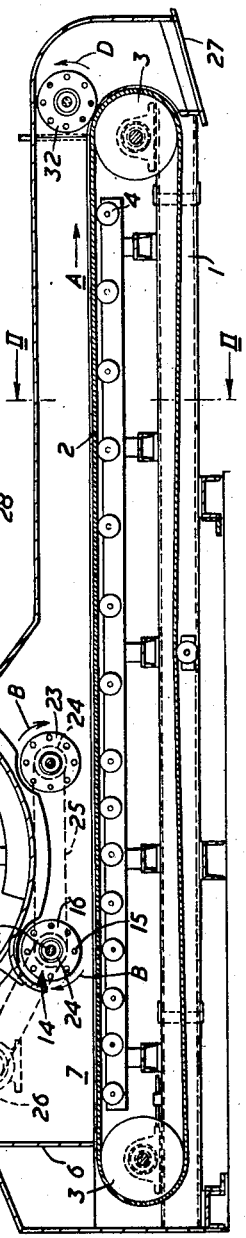
INVENTOR
WILLIAM SMALLEY
BY Irvin S. Thompson
ATTORNEY Dec. 25, 1962  W. SMALLEY  3,070,261
CONVEYOR FEEDERS Filed Feb. 19, 1960  3 Sheets-Sheet 2

INVENTOR
WILLIAM SMALLEY

BY Irwin S. Thompson

ATTORNEY.

Dec. 25, 1962  W. SMALLEY  3,070,261
CONVEYOR FEEDERS

Filed Feb. 19, 1960  3 Sheets-Sheet 3

INVENTOR
WILLIAM SMALLEY

BY Irwin S. Thompson

ATTORNEY

United States Patent Office 3,070,261
Patented Dec. 25, 1962

3,070,261
CONVEYOR FEEDERS
William Smalley, Gloucester, England, assignor to Wm. Gardner & Sons (Gloucester) Limited, Gloucester, England
Filed Feb. 19, 1960, Ser. No. 9,858
Claims priority, application Great Britain Feb. 21, 1959
3 Claims. (Cl. 222—55)

This invention relates to the feeding of material to a conveyor and is concerned with an improved means and method for achieving such feeding.

Material is normally fed to a conveyor, whether of the constant weight or constant volume type, from a feed hopper or box which has an open bottom disposed above the conveyor surface, the material being drawn forward by movement of the conveyor's surface through a front feed opening provided with an adjustable gate. The height of the gate controls the depth of material fed to the conveyor, and the rate of feed is controlled by varying this height and/or the speed of the conveyor. Whilst such an arrangement serves adequately for sufficiently free-flowing materials, it is highly unsatisfactory for "difficult" materials such as wood-shavings and celluslosic materials of the nature of cotton-wool. Such materials tend to build up and compact behind the gate and a very uneven and often discontinuous feed results.

The main purpose of the invention is to provide an improved means and method for feeding material to a supply conveyor which produces satisfactory results with previously difficult materials such as wood shavings.

Means for feeding material to a conveyor, according to the invention, comprise a feed hopper having a bottom opening for positioning above the surface of the conveyor, means for supplying the material in a "live" state to the hopper so as to maintain a reasonably constant head of material therein, a spaced series of elements of small cross-section extending transversely across the hopper at a front feed opening thereof and arranged to be traversed along a closed path at the bottom of which the elements travel in the opposite direction to the conveyor, and a fixed surface disposed immediately above said path to prevent material being carried forward by the elements around the top of said path.

As used herein with reference to the material the term "live" is intended to signify that the material is in a free, loose and uncompacted condition.

The elements of small cross-section are preferably small diameter rods or wires, for example tensioned lengths of piano wire, and they each conveniently follow a circular path about a common centre. For example, parallel lengths of piano wire may be tensioned in a spaced ring between two circular discs which are fixed on a rotatably mounted spindle.

In means constructed in accordance with the invention the conventional hopper gate is dispensed with, the level of material fed on to the conveyor being determined by the height of the bottom of the path of the elements, hereinafter termed "trimming elements," above the conveyor. Preferably this height is fixed and the rate of feed controlled by varying the conveyor speed. The action of the trimming elements is such that not only is the layer of material on the conveyor smoothed off but the material in the hopper is constantly maintained in the live state.

Although it is normally preferable to control the feed rate by adjustment of the speed of the conveyor surface, in some cases it may be found desirable to effect such control by adjustment of the height of the trimming elements above this surface. When automatic control of the feed rate is required either a portion of the conveyor surface itself, or of a separate weighing conveyor to which the surface delivers, may be weighed, control means being provided such that deviation of weight from a preset value acting automatically to produce the appropriate correction in the speed of the conveyor surface and/or the height of the trimming elements above the latter.

Said fixed surface is preferably provided by a fixed plate having a rearwardly and downwardly directed lip under and close to which the trimming elements successively pass. When the elements follow a circular path about a common centre the lip is preferably disposed somewhat rearwardly of that centre.

The single series of trimming elements produces a most marked improvement in the feeding of materials which were previously extremely difficult to handle, and for the more difficult materials a still further improvement can be obtained by arranging a second series of trimming elements spaced from the other in the feed direction and arranged slightly nearer to the conveyor surface. Both series of elements move in the same sense around their respective closed paths.

There is generally no need to provide a fixed surface preventing forward feeding by the second series of trimming elements, and their action maintains a small reservoir of material in the live state between them. This small reservoir is available to supply any slight deficiencies in the feed leaving the first series of elements.

The invention also includes within its scope a method of feeding material to a conveyor, wherein a mass of the material is maintained above the conveyor surface at a reasonably constant level, a series of trimming elements is caused to travel along a closed path above the conveyor surface so as to move in the opposite direction to the latter at the bottom of said path, and the conveyor is moved forwardly to feed material from said mass under the elements whilst the latter act to trim and smooth the surface of the layer of material on the conveyor.

The means and method of the invention are particularly applicable to the feeding of moving belt constant volume conveyors, but the invention is also of utility as applied to other types of conveyors, for example vibrating conveyors.

It is desirable that the velocity of the trimming elements should be at least equal to, and preferably somewhat greater than, the velocity of feeding movement of the conveyor surface.

The invention will now be further described with reference to the accompanying drawings which illustrate, by way of example, several arrangements of feeding means and associated conveyors in accordance with the invention, and in which:

FIGURE 1 is a longitudinal sectional view of one of the arrangements,

FIGURE 2 is a sectional view on the line II—II in FIGURE 1.

Figure 3:
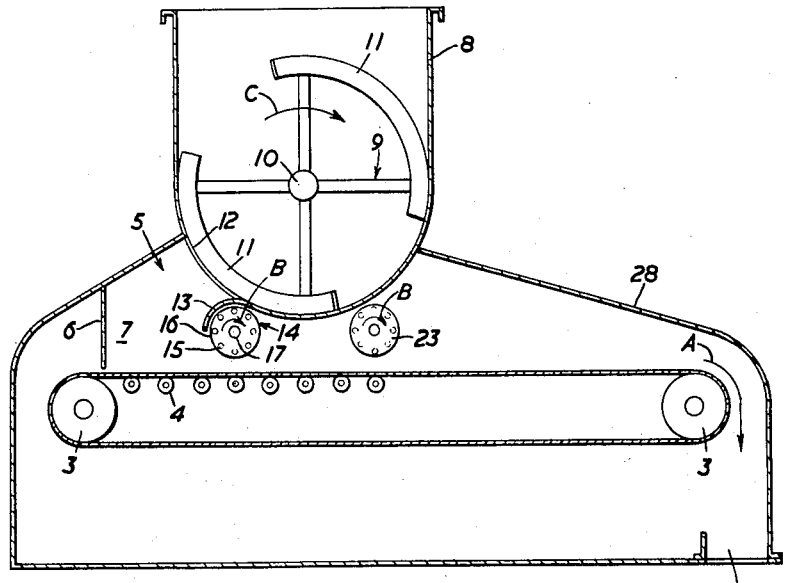
FIGURE 3 is a diagrammatic sectional view, corresponding to that of FIGURE 1, of a second of the arrangements.

Each of the arrangements illustrated has been developed for use with such previously difficult materials as wood shavings which do not normally flow easily and cannot therefore be satisfactory fed by either a feed worm or a normal type of feed belt using a bunker having a fixed gate. Other materials for which the arrangements are suitable are, for example, materials such as icing sugar, starch and ground coconut which in the presence of moisture tend to aggregate.

Referring particularly to FIGURE 1, each of the arrangements comprises a base structure 1 on which is mounted the conveyor which comprises a moving belt 2 which moves in the direction of the arrow A and is carried at its ends on drive rollers 3. The upper run of the belt 2 is supported by conveyor rollers such as 4 and has positioned above its rear end a feed hopper 5 having a completely open bottom which is closed by the belt 2.

The hopper 5 is of box-like form with vertical rear and side walls 6 and 7 respectively. The top and front wall of each hopper 5 is formed by a trough-like bunker 8 of U section which is of considerably greater width than the hopper 5 and is spaced above the belt 2 and defines the front feed opening of the hopper. A slow-running agitator 9 of interrupted spiral form is fitted to the bunker 8 and comprises a motor-driven shaft 10 on which are mounted a plurality of spaced vanes 11 of helical shape (see particularly FIGURE 6). The bunker 8 has in its rear side a supply aperture 12 and the wall of the bunker at the lower edge of this aperture, which extends the full width of the hopper 5 and communicates therewith, curves downwardly and rearwardly to provide an arcuate lip-like section 13.

Figure 7:
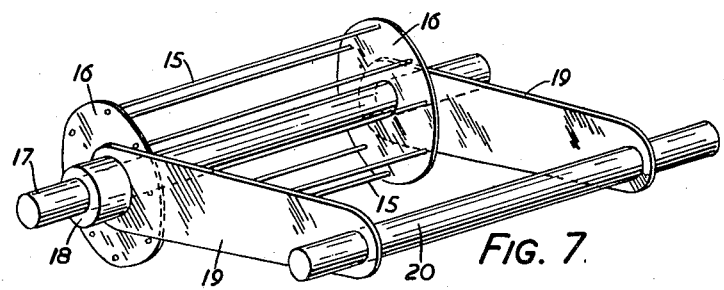
FIGURE 7 is a detail view of this arrangement.

A rotary trimmer 14 beneath the arcuate section 13 is rotatably mounted about a horizontal axis disposed laterally of the hopper 5 and the belt 2, and comprises (as shown in FIGURE 7) an annular ring of lengths of piano wire 15 tensioned between two end discs 16 fixed to a motor driven shaft 17. The lengths of wire 15 form trimming elements and the trimmer 14 is spaced above the belt 2 according to the depth of the layer of material it is desired to feed. The arcuate lip 13 is disposed close to the periphery of the trimmer 14 so as to overhang the shaft 17.

Figure 5:
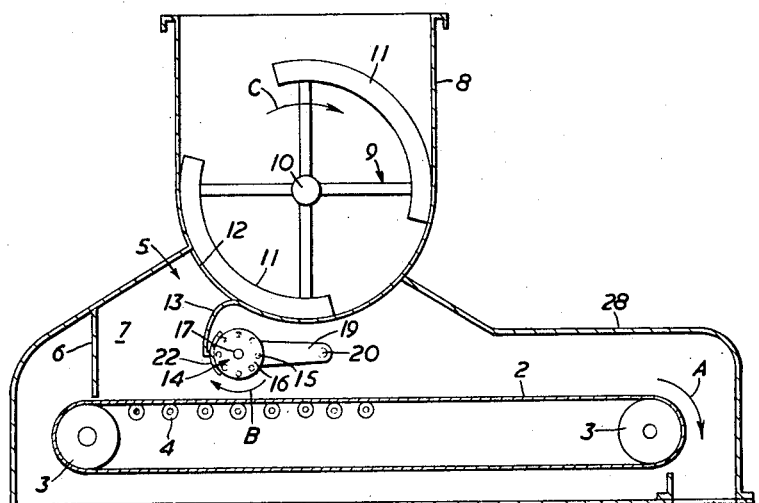
FIGURE 5 is a similar view of another arrangement.
Figure 6:
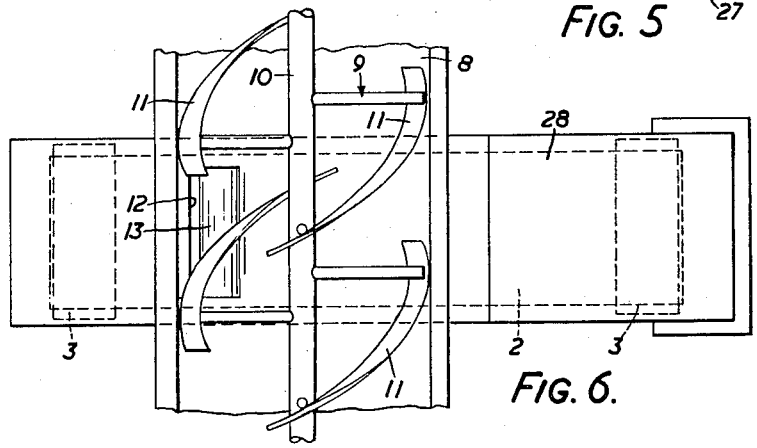
FIGURE 6 is a fragmentary plan view of the arrangement of FIGURE 5.

The shaft 17 is mounted in bearings such as 18, which in the arrangements of FIGURES 1 to 4 are fixed to the side walls 7 of the hopper 5. In the arrangement of FIGURES 5 to 7 the height of the trimmer 14 above the belt 2 is adjustable, and for this purpose the bearings 18 are respectively mounted on swinging arms 19 which swing on a shaft 20 mounted for rocking movement in the side walls 7. Raising or lowering the trimmer 14 for a given speed of the belt 2 varies the feed rate of the latter; with the other arrangements in which the height of the trimmer 14 is fixed the feed rate is varied by adjusting the belt speed. To enable the trimmer 14 to be adjusted in height, the section 13 has a forward extension 22 of generally arcuate shape which is arranged close to the periphery of the trimmer.

In FIGURES 1 to 4, a further rotary trimmer 23 is similarly mounted in front of the trimmer 14 in fixed bearings but is disposed slightly nearer to the belt 2 with its vertical spacing from the latter corresponding to the desired final layer depth. As shown in FIGURE 1, the shafts such as 17 of the rotary trimmers 14 and 23 have sprockets 24 at one end for chains 25 by which they are coupled to a driving motor 26 for rotation in the direction of the arrows B.

In use the agitator 9 rotates in the direction of the arrow C to deliver material stored in the bunker 8 through the supply aperture 12 into the hopper 5. The action of the agitator 9 prevents the material in the bunker 8 from bridging over the aperture 12 and ensures that the material is delivered into the hopper 5 in a live state. As the aperture 12 is arranged in the side of the bunker 8 the material is discharged from the latter at a point where it is not under pressure and hence not compacted, and the formation of the agitator 9 provides complete discharge of the material in the bunker 8 through this aperture. The hopper 5 acts as an expansion chamber into which the material is discharged and ensures that the material remains in its live state. Movement of the belt 2 in the direction of the arrow A draws the material forward from the hopper 5 underneath the rotary trimmers 14 and 23.

The trimmers 14 and 23 are driven so that their peripheral velocity is greater than the velocity of the belt 2 and they perform a trimming action on the material fed, as the trimming elements 15 when adjacent the belt 2 move in the opposite direction thereto. These elements have a two-fold action; as they move along the bottom point of their travel they form a "live" gate which regulates the height of material on the belt and as they thereafter move upwards they remove from behind the gate any material which would otherwise be liable to back-up and prevent steady feed.

Thus the action of the trimmer 14 not only determines the feed to the belt 2 from the hopper 5 but also maintains the supply of material in the latter in a live state. In FIGURES 1 to 4 the trimmer 23 provides a final and accurate level of material on the belt 2 and, as this trimmer is slightly nearer to the belt 2 than the trimmer 14, a small live excess supply of material is maintained in the space between the trimmers above the final level on the belt. Thus this space forms a reservoir from which any localised deficiencies in the feed from the larger trimmer can be made up, and the final level of material on the belt 2 is determined by the clearance between it and the trimmer 23. The supporting rollers 4 are arranged so that the surface of the conveyor or belt 2 is substantially flat at least between and in the region of the trimmers 14 and 23. In FIGURES 5 to 7 the level of material fed to the belt is controlled by the single trimmer 14, and this simpler arrangement is used where a constant feed rate/minute is all that is required and slight inequalities in level from inch to inch of the belt 2 are not important.

Figure 4:
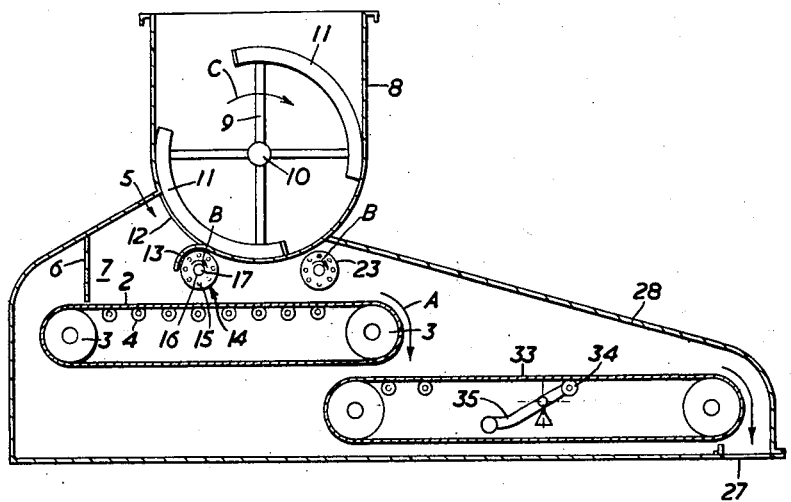
FIGURE 4 is a similar view of a modified arrangement.

In all the arrangements, except the modification of FIGURE 4, the belt 2 delivers the material directly to a downwardly facing flanged delivery aperture 27 in a sheet metal casing 28 enclosing the conveyor. This casing (as shown in FIGURE 2) incorporates cheek plates 29 which are continuations of the side walls 7 and are provided at their lower edges with resilient sealing lips 30 engaging the upper surface of the belt 2. These cheek plates, which are also provided in the arrangement of FIGURE 5, control the width of the layer of material on the belt 2.

The arrangement of FIGURES 1 and 2 has a further cage-like rotary member 32 at the end of the belt 2 slightly above the latter. This member 32 is of generally similar construction to the trimmers 14 and 23 but rotates in the opposite direction as shown by the arrow D, so that its main action is not to trim the layer of material on the belt 2 but rather to break it up so that it falls in an even stream off the belt 2 and through the delivery aperture 27. The member 32 has an individual motor drive (which is not illustrated) and is only incorporated when the material being fed is of a very difficult nature and a very even feed from the belt 2 to the aperture 27 is required.

The height of the trimmers 14 and 23 controls the volumetric feed rate of the conveyor, but in some circumstances it is necessary to deliver a constant weight/minute with a material of varying density. An arrangement in accordance with the invention is very suitable for automatic control of the feed rate by weight of the conveyor, and to this end the modification of FIGURE 4 has a separate weighing belt 33 to which the belt 2 delivers and which itself delivers directly to the aperture 27. The belt 33 has a weighed section supported on a roller 34 mounted on one end of a weigh-beam 35 movement of which, from a preset balance position, acts to vary the speed of the belt 2 to correct the volume delivery of the latter in a manner which will bring the beam 35 back to its balance position.

A belt such as 33 can alternatively be used with the arrangement of FIGURES 5 to 7, and in this case movement of the beam 35 is arranged to raise or lower the swinging arms 19 in the appropriate manner to correct the feed rate of the conveyor. In some circumstances it may be found desirable to control both the height of the trimmer 23 and the speed of the belt 2 to provide the desired control of the feed rate.

I claim:
1. Means for feeding material to a conveyor comprising a feed hopper having a bottom opening for closure by the conveyor and a front feed opening communicating with the bottom opening to extend above the conveying surface of the conveyor, means for supplying material in a "live" state to the hopper so as to maintain a reasonably constant head of material therein, a first trimmer extending transversely across the front feed opening, said trimmer comprising a series of spaced-apart trimming elements each extending transversely of the front feed opening and arranged to traverse around a closed path at the bottom of which the element travels in the opposite direction to the conveying surface, a fixed surface disposed immediately above the first trimmer to prevent the elements thereof from carrying material out of the hopper around the top of said path, and a second trimmer spaced from the first trimmer in the direction of conveying movement of the conveyor, said second trimmer comprising a series of trimming elements each extending transversely of the direction of conveying movement and arranged to move around a closed path at the bottom of which the element travels in the opposite direction to the direction of conveying movement, the bottom of the path traversed by the elements of the second trimmer being somewhat nearer to said conveying surface than the bottom of the path traversed by the elements of the first trimmer.

2. Means according to claim 1, wherein each trimmer comprises a plurality of parallel lengths of small diameter rods or wires extending between a pair of rotatably and coaxially mounted circular discs, and wherein the rods or wires lie substantially on the surface of a cylinder.

3. Means for feeding material to a conveyor, comprising in combination: a trough-like bunker for receiving the material, said bunker having a feed aperture, a feed hopper mounted adjacent to and extending below said bunker, said feed hopper communicating with the bunker through said feed aperture, a moving belt conveyor passing underneath said feed hopper, said feed hopper having a bottom opening closed by the adjacent conveyor and a front feed opening communicating with said bottom opening and extending above the conveying surface of the conveyor, a rotary trimmer having active elements disposed at a substantial distance from its axis, said rotary trimmer extending transversely across said front feed opening and immediately below said feed aperture for simultaneously regulating the quantity of material fed to the conveyor and restricting the material passing through said feed aperture in a "live" state, means for rotating said trimmer to traverse said elements along a circular path so that at its bottom portion each element travels in the direction opposite to the movement of said conveyor and then opposite to the material descending through said feed aperture, and a fixed surface disposed immediately above said trimmer to prevent said elements from carrying any material out of the feed hopper around the top of the circular path.

References Cited in the file of this patent
UNITED STATES PATENTS

| | | |
|---|---|---|
| 1,537,123 | Leopold | May 12, 1925 |
| 1,651,633 | Ross | Dec. 6, 1927 |
| 1,708,062 | Hartshorn | Apr. 9, 1929 |
| 2,708,503 | Arnold | May 17, 1955 |
| 2,710,125 | Brown | June 7, 1955 |
| 2,822,024 | Himmelheber et al. | Feb. 4, 1958 |
| 2,822,028 | Himmelheber et al. | Feb. 4, 1958 |